March 4, 1947.  C. A. ADAMS ET AL  2,416,670
ALTERNATING CURRENT BUS BAR CONSTRUCTION
Filed Sept. 24, 1941  2 Sheets-Sheet 1
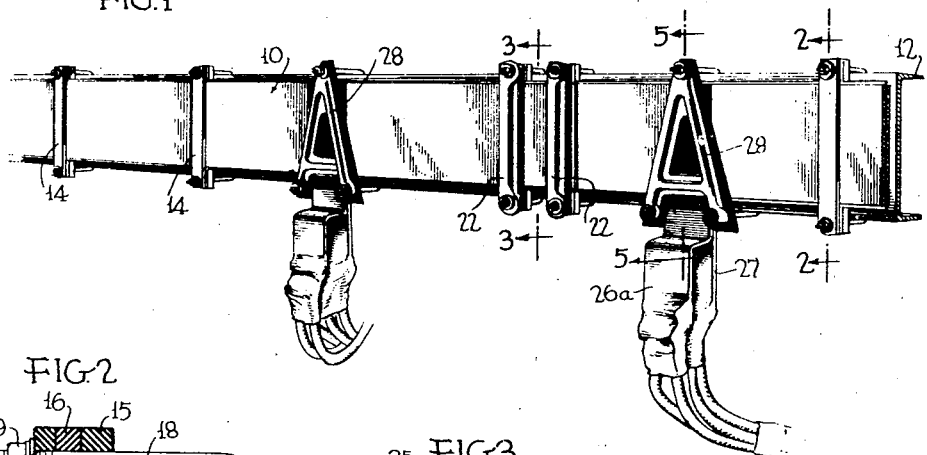
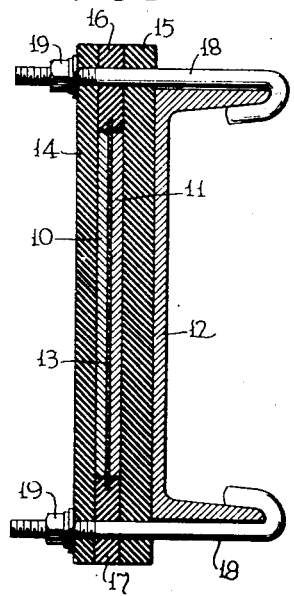
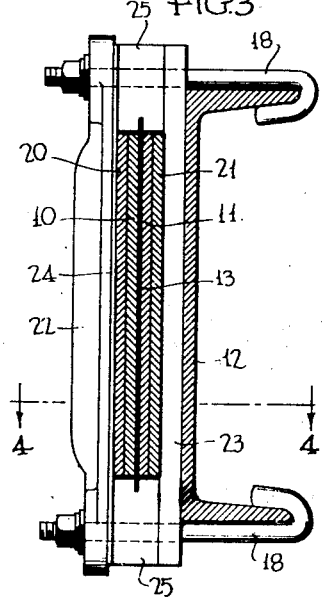
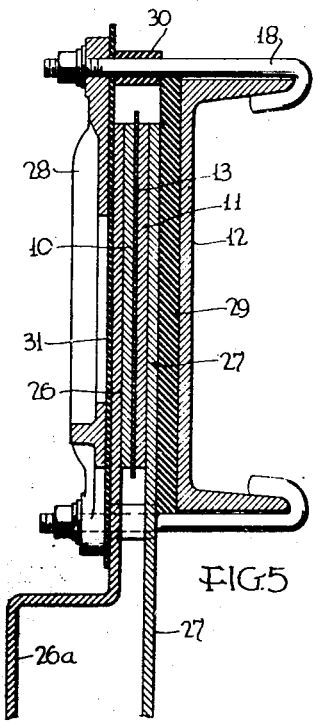
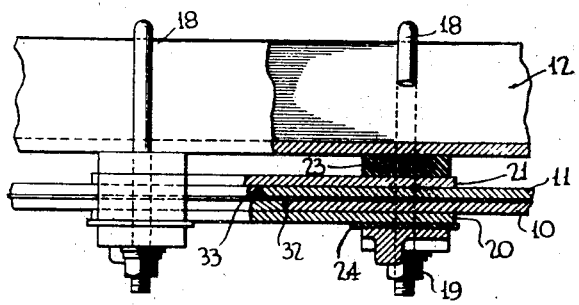
INVENTORS
Comfort A. Adams
John R. Fetcher
George Stocker
BY
ATTORNEY March 4, 1947.    C. A. ADAMS ET AL    2,416,670
ALTERNATING CURRENT BUS BAR CONSTRUCTION
Filed Sept. 24, 1941    2 Sheets-Sheet 2
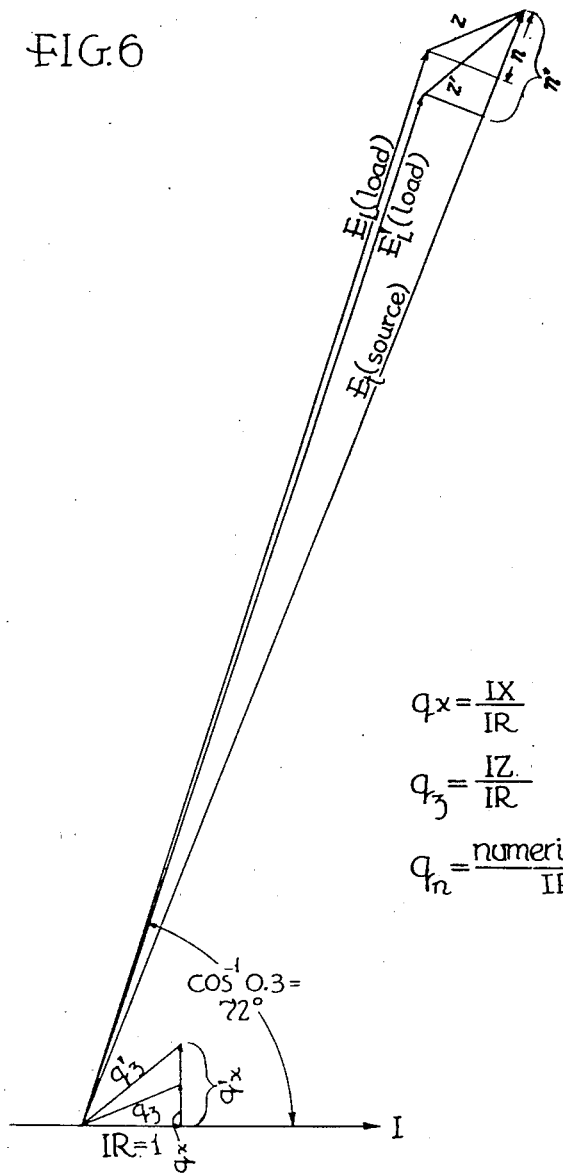
FIG. 6
$$q_x = \frac{IX}{IR}$$
$$q_3 = \frac{IZ}{IR}$$
$$q_n = \frac{\text{numerical drop}}{IR}$$
INVENTORS.
Comfort A. Adams
John R. Fetcher
George Stocker
BY
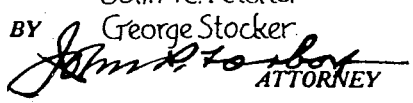
ATTORNEY Patented Mar. 4, 1947

2,416,670

UNITED STATES PATENT OFFICE 2,416,670

ALTERNATING CURRENT BUS BAR CONSTRUCTION

Comfort A. Adams, Germantown, and John R. Fetcher, Rosemont, Pa., and George Stocker, Audubon, N. J., assignors to The Budd Company, Philadelphia, Pa., a corporation of Pennsylvania Application September 24, 1941, Serial No. 412,160

10 Claims. (Cl. 171—97)

This invention relates to bus bar feeders for carrying heavy alternating currents, which bars are so designed as to have a minimum reactance and a maximum simplicity of structure and support.

One object is to reduce materially the numerical voltage drop for low power factor loads such as commonly occur in connection with resistance welding.

Another object is to provide a construction that is simple and rugged, and capable of being mounted with minimum expenditure of labor and materials.

Another object is to provide a bus bar construction for heavy alternating currents in which branches may be quickly and conveniently attached.

A further object is to provide a construction that is adapted to be carried by and close to a substantially rigid supporting frame of magnetic material such as steel without danger of increased reactance or of heavy eddy current losses in such frame.

Yet another object is to provide a structure which will withstand safely the unusual mechanical forces of repulsion between conductors under conditions of short circuit.

It is known that when a pair of conductors is employed to carry an alternating current, there is a quadrature reactive voltage drop in addition to the resistance drop which would occur if the current were direct or continuous. This reactive drop is directly proportional to the magnitude of the current, to its frequency and to the permeance of the magnetic circuit linking each current. Although this knowledge has been utilized in the past for the purpose of reducing the reactive drop, it has to the best of our knowledge and belief never been employed as satisfactorily as in the present construction for welding feeders. The economically successful application of these principles involves structural features which are not in use. For example, the force of repulsion between the two parallel conductors is known to decrease as their spacing increases. Eddy current losses in iron supports increase as the square of the flux through the iron. For these reasons it has been customary to avoid very close spacing of the bus bars and any iron or steel supports for them.

The advantage of close spacing for bus bars from the electrical point of view is much greater than has been appreciated by those who have previously dealt with this problem. Although the variation in impedance due to a variation in reactance within the range under consideration may be relatively small, the effect of this variation upon the numerical voltage drop is magnified in many resistance welding circuits where the power factor of the load is low, varying between about 0.3 to 0.4.

It has been customary to keep iron or steel supporting structures far away from bus bars carrying heavy alternating current since it is known that eddy current losses increase approximately as the square of the flux from such bars. Under the present invention it has been discovered that the flux around such bus bars may be so greatly reduced by bringing the bus bars as close together as has been done that such iron may be brought close to the bus bars without objectionable heating. We have found it possible to employ steel clamps which are separated from the bar conductors by fiber insulation of only ⅛" thickness. We have also found it possible to support the whole structure on the web of a channel or other structural shape without the necessity of separating the inner conductor from the web by a large spacing. The wider the spacing between conductors, the larger will be the interlinking flux, the greater will be the undesirable influence of the neighboring iron on the reactance of the feeder, and the greater the danger of energy loss due to eddy currents in the neighboring iron or steel, with the accompanying increase in apparent resistance of the feeder circuit. The close spacing of the bus bars increases the reluctance of the path for flux around each bus bar to so large an extent that any decrease in reluctance due to the structural shape illustrated is only about 2% or 3% of the total reluctance.

If the bus bars are spaced widely enough apart so as not to reduce the flux, it is estimated that if the same supporting channel illustrated were spaced as shown, that the decrease in reluctance due to the iron would be much greater and possibly as much as 40% and the reactance correspondingly increased.

Tests show that with a current density of 1000 amperes per square inch continuously applied, the ultimate temperature rise is in the bus bars less than 30° C., which is low for heavy feeders of any type.

In the drawings:

Figure 1 shows a perspective of a preferred embodiment of this invention;

Figure 2 is a section on the line 2—2 of Figure 1;

Figure 3 is a section on the line 3—3 of Figure 1;

Figure 4 is partly a section on the line 4—4 of Figure 3;

Figure 5 is a section on the line 5—5 of Figure 1;

Figure 6 is a vector diagram showing one advantage from the spacing of the bus bars about 1/16" instead of about 1/4" between their adjacent faces.

The bus bars 10 and 11 are separated only by a narrow layer of insulation 13 about 1/16 of an inch thick (for about 550 volts or less) which is clamped between the bars. These bus bars are supported from a steel channel 12 or other structural shape.

In Figure 2 the clamp members 14 and 15 are of some appropriate type insulating material that does not become compressed during use. A wide variety of insulating materials will be found suitable such as phenolic condensation products, resinous plastics, fiber, etc.

The insulating blocks 16 and 17 may allow for movement of the bars 10 and 11 and take a major part of the compression applied by the tension members or hook bolts 18 shown as having engagement with the sides of the channel and provided with a clamping nut 19. The recess or slot for reception of the edge of the insulating material 13 is preferably of such size as to enable the insulating material to be freely inserted within the recess.

The magnetic stresses due to the flow of heavy alternating currents of different potential in the bus bars tend laterally to spread or separate them, so that the clamp members 14 and 15 are made to withstand these separating stresses in order to prevent the bus bars from being forced out of shape. For this reason the clamps shown in Figure 2 are preferably arranged close enough together to prevent any substantial outward bending of the bus bars away from one another.

In Figures 3 and 4 is shown the manner of connecting the bus bars to transmit current from one length of bar to another. The ends of the bus bars 10 and 11 are juxtaposed in alinement with additional lengths of these bars as shown at 32 and 33 in Figure 4. Short lengths of bus bars 20 and 21 are held against the side face of each bar 10 and 11 by clamping members 22 and 23. The contacting faces of the bars may be silver plated. These clamping members 22 and 23 may be of iron or steel. To maintain a uniform compression on the contact surfaces of the bus bar splice, bell type washers are inserted between the clamping nut and the clamp 22. When the clamping members are of metal each bus bar should be insulated from said members.

In Figure 3 the clamping member 23 is of insulating material. whereas the outer clamp member 22 is of cast iron or steel, being provided with a strengthening rib longitudinally thereof, as illustrated, and being separated from the adjacent bus bar bridging element 20 by the insulating material 24.

The insulating blocks 25 have the same function as was described in connection with the blocks 16 and 17 in Figure 2 except that they allow the bus bars 10, 11, 20, and 21 to be tightly clamped.

Figure 5 shows one way of connecting a branch or tap to the bus bars quickly and easily without the necessity of the bus bars being perforated for reception of any clamping members. In electrical contact with a face of each of the bus bars 10 and 11 are the end portions of the connectors 26 and 27 clamped against the bus bars by the A-shaped clamping member 28 which compresses the bus bars and the connecting strips 26 and 27 against the abutment 29 of insulating material.

To widen the separation between the connecting strips, the contact member 26 is provided with an offset portion 26a, as shown in Figures 1 and 5, to better enable cables or other conductors to be attached thereto and yet have adequate clearance between the contact strips. Bushings 30 of insulating material prevent the taps 26 and 27 from accidentally touching the hook bolts 18.

In the construction shown in Figure 5 the projecting ends of the insulating layer 13 are not received in any spacing block. The insulating layer 31 separates the clamp member 28 from the adjacent contact member 26.

The close spacing of the bus bars increases the reluctance of the magnetic circuit for the flux about any one bus bar to so great an extent that the total flux linking the current in a single conductor is very substantially reduced owing to the crowding of the flux within the narrow space separating the bus bars. This reduction in the flux makes possible the location of a structural shape 12 for supporting the bus bars close to them without danger of this steel shape absorbing an objectionable amount of energy in eddy current and hysteresis losses in heating.

In the embodiment illustrated the bus bars in one installation were of quarter inch copper, 8 inches wide and in 20 foot lengths. When clamped on the insulating material 13 the separation of the bus bar faces was about 0.060 inch, the clamping abutments 23 and 29 are one-half of an inch in thickness while the insulating layers 24 and 31 are about 1/8 of an inch in thickness. The clamping members 22 and 28 are substantially to scale as are the other members illustrated. Where the clamping members of the type shown in Figures 1 and 3 are used they permit the application of stronger clamping pressure for splicing the bus bars than is needed with the supporting clamps 14 and 15.

As shown in the drawing the web of the steel channel 12 is about one-quarter of an inch and is considerably thicker than the spacing of the bus bars.

The insulating blocks 16 and 17 may if desired be made only very slightly thicker than the bus bars and insulation 13, so that when the current is off these blocks take the principal part of the clamping pressure, while when the current is on the tendency to spread the bus bars may cause the bars to take the principal part of the clamping pressure, though such precision in thickness is not necessary nor usually desirable. Ordinarily the bars should be held so that movement thereof is snug.

The adaptability of branches to be connected to the bus bars at almost any location without the necessity of having the bars perforated is an important advantage in a temporary installation where the absence of perforations in the bus bars adds to their value for subsequent use in another installation where, if perforations were used, they might have to be at different locations.

The installation described has been for use in connection with welding apparatus using 60 cycle alternating current. With 60 cycle current an advantage is believed to reside in the increased reluctance of the flux path around either bus bar, but with considerably higher frequencies the capacity reactance between the bus bars might become a more important element contributing to improved power factor and lower voltage drop.

An expanded metal screen was placed around the bus bars where it was desired to protect them without impeding their ventilation, such screen being carried by projecting hook bolts.

Figure 6 is a vector diagram in which the total voltage $E_t$ is at the supply end of the bus bars. The voltage at the load when the bars are spaced ¼" between their adjacent faces is $E^1{}_L$ there being a larger reactance drop along the buses when so spaced than when they are spaced ₁⁄₁₆" apart when the voltage at the load is $E_L$. Since the actual resistance and reactance of a given feeder varies considerably with different sizes, it will be more convenient to express them in terms of each other. The ratio of reactance to resistance is labelled $q_x$. Similarly, the ratio of the impedance or impedance drop to the resistance or resistance drop is labelled $q_z$ and the ratio of the numerical drop of voltage produced by this impedance to the resistance drop labelled $q_n$. It is this latter with which we are most concerned, particularly with low power factor loads such as prevail in resistance welding circuits. For a feeder designed according to the present invention and using 60 cycle current, $q_x$ is about 0.42 and for the ¼" spacing between faces referred to above $q_x$ is about 0.81. The corresponding impedance ratios $q_z$ are 1.08 and 1.28, whereas the numerical drop ratios ($q_n$) are, taken in the same order, 0.70 and 1.07. Thus, the per cent increase of numerical drop is 53% for the ¼" spacing over the smaller spacing of 0.06 inch in this invention, whereas the increase in $q_z$ is only 18.5%. This comparison is based upon a power factor of 0.30. The differences would be only slightly less for a power factor of 0.40. Although Figure 6 shows the power factor of $E_L$ to be slightly lower than $E'_L$ such is not correct and has only been shown so for simpler illustration of the values $q_z$, $q'_z$, $q_n$, $q'_n$. In the impedance diagram at the top of the figure the notations $z$ and $z'$ appear for the ₁⁄₁₆" and ¼" values, respectively, and the letters $n$ and $n'$ for the corresponding numerical voltage drop from the source value.

Although one embodiment of the invention has been illustrated and described, it is to be understood that the invention is not to be limited thereto but may be employed in other equivalent arrangements and forms. As many changes in construction and arrangement may be made without departing from the spirit of the invention as will be apparent to those skilled in the art, reference will be had to the appended claims for a definition of the limits of the invention.

What is claimed is:

1. In an electrical circuit distribution system supplied by a source of alternating current, a pair of bus bars adapted for series transmission of current to a load from said source, an insulating material between said bars, a metal clamp pressing said bars together upon said material, said clamp being insulated from at least one of said bars and having a portion contiguous one of said bars formed of magnetic material, said insulating material having a thickness of less than a fifth of an inch whereby heating in said clamp is reduced to negligible values.

2. In an electrical distribution system supplied by a source of alternating current, at least two parallel bus bars connected to transmit current in series through a load from said current source, and a support of ferro-magnetic material also in the shape of a bar juxtaposed to said bus bars and attached thereto throughout its length and forming a solid unit therewith, said bus bars being separated from each other at a distance such that the ratio of change of reluctance due to the support to the total reluctance of the bus bars is not over one-tenth.

3. In an electrical system supplied by a source of alternating current, a pair of parallel bus bars adapted to receive current from said source in series relation, said bus bars being spaced apart approximately one-sixteenth of an inch, a support for said bus bars positioned adjacent thereof, insulation material between the support and the bus bars and a plurality of clamps connecting the support, insulation and bus bars together as an integral unit, the parts contacting with each other substantially along their entire length, said clamps being at least in part of magnetic material.

4. In an electrical distribution system supplied by a source of alternating current, a pair of parallel bus bars, a ferro-magnetic support adjacent the bus bars, and insulation material interposed between the support and bus bars to form an integral inter-engaging unit, the bus bars being separated from each other such a distance that with a 60-cycle current and power factor load of approximately 0.3 the numerical voltage drop is approximately 17% less than the impedance drop.

5. In an electrical distribution system supplied by a source of alternating current, a pair of bus bars adapted to be connected in series relationship to said source, a ferromagnetic support positioned in proximity to said bus bars, and insulation material bridging the area between the support and bus bars to form a unified structure, said bus bars being spaced from each other a distance such that the numerical drop in voltage along said bars under conditions of low power factor is less at about 60 cycles than the IR drop along the bars.

6. In an electrical distribution system supplied by a source of alternating current, a bus bar unit connected to said source, said unit comprising a bus bar, a ferro-magnetic support therefor constituting a unified structure with said bus bar, and means for diminishing to a negligible value the ratio of change of reluctance due to the support to the total reluctance of the bar.

7. In an electrical distribution system supplied by a source of alternating current, a bus bar unit connected to said source, said unit comprising a bus bar, a ferro-magnetic support therefor constituting a unified structure with said bus bar, and means for diminishing to a negligible value the ratio of change of reluctance, due to the support, to the total reluctance of the bar, said means comprising a second bus bar in parallel relationship to said first mentioned bus bar.

8. In an electrical distribution system supplied by a source of alternating current, two parallel bus bars adapted to receive current from said source in series relationship therewith, a support of magnetic material adjacent one of said bars, insulation material bridging the area between said support and bus bar to form a rigid unit therewith, and clamping means for securing the bars to the support and insulation material, the distance between bars being less than the distance at which the change of reluctance due to the support forms more than a negligible part of the total power reluctance of the bars.

9. In an electrical distribution system supplied by a source of alternating current, two parallel bus bars adapted to receive current in series relation from said source, layers of insulation between said bars and external to at least one of said bars, a support of magnetic material in the form of a continuous strip in contact with said external insulation and forming with said insulation and bars an integral unit, and clamping means for securing the bars and insulation to the support, the distance between bars being less than the distance at which the change of reluctance due to the support forms more than a negligible part of the total bar reluctance.

10. In an electrical distribution system supplied by a source of alternating current, two parallel and adjacent bus bars adapted to receive current from said source in series relationship, a strip of insulation between said bars, a continuous length of magnetic metal support adjacent one of said bars, an insulation strip between said support and bar, means for binding said support, bars and insulation together, said inter-bar insulation strip having a thickness less than one-fourth of an inch.

COMFORT A. ADAMS.
JOHN R. FETCHER.
GEORGE STOCKER.

REFERENCES CITED

The following references are of record in the file of this patent:

UNITED STATES PATENTS

| Number | Name | Date |
| --- | --- | --- |
| 2,246,806 | Martin | June 24, 1941 |
| 1,620,552 | Jacobs et al. | Mar. 8, 1927 |
| 2,031,975 | Northrup | Feb. 25, 1936 |
| 2,223,300 | Bellis | Nov. 26, 1940 |
| 2,044,604 | Cornell | June 16, 1936 |
| 2,247,088 | Hill | June 24, 1941 |
| 2,097,324 | Hill | Oct. 26, 1937 |
| 2,287,502 | Togesen | June 23, 1942 |
| 2,288,078 | Fisher | June 30, 1942 |
| 2,262,067 | Togesen | Nov. 11, 1941 |
| 1,996,326 | DeCoux | Apr. 2, 1935 |
| 1,979,090 | Alsaker et al. | Oct. 30, 1934 |

OTHER REFERENCES

General Electric Co., Catalogue 6001-B, P. 273, paragraphs under "Induced Heating of Adjacent Iron."